(12) United States Patent
Changizi

(10) Patent No.: US 11,625,682 B2
(45) Date of Patent: *Apr. 11, 2023

(54) PERSONA-BASED APPLICATION PLATFORM

(71) Applicant: CoreLogic Solutions, LLC, Irvine, CA (US)

(72) Inventor: Sam Changizi, Irvine, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 17/008,345

(22) Filed: Aug. 31, 2020

(65) Prior Publication Data

US 2021/0090026 A1    Mar. 25, 2021

Related U.S. Application Data

(63) Continuation of application No. 15/436,629, filed on Feb. 17, 2017, now Pat. No. 10,789,571.

(51) Int. Cl.
*G06F 16/2457* (2019.01)
*G06Q 10/10* (2023.01)

(52) U.S. Cl.
CPC ......... *G06Q 10/10* (2013.01); *G06F 16/2457* (2019.01)

(58) Field of Classification Search
CPC .......................... G06Q 10/10; G06F 16/2457
USPC ....................................................... 707/754
See application file for complete search history.

(56) References Cited

U.S. PATENT DOCUMENTS

| | | | | |
|---|---|---|---|---|
| 6,633,878 B1* | 10/2003 | Underwood | ........... | G06Q 10/10 707/999.102 |
| 7,100,195 B1* | 8/2006 | Underwood | ........ | H04L 63/0823 707/999.009 |
| 7,151,438 B1* | 12/2006 | Hall | ....... | G06Q 10/10 707/999.102 |
| 7,401,097 B1* | 7/2008 | Baer | ..................... | G06F 40/143 |
| 8,055,910 B2* | 11/2011 | Kocher | ................... | G06F 21/10 713/168 |
| 8,468,244 B2* | 6/2013 | Redlich | .................. | G06Q 50/18 715/255 |
| 8,478,668 B2 | 7/2013 | Woodward et al. | | |
| 9,805,213 B1 | 10/2017 | Kragh | | |
| 10,255,419 B1* | 4/2019 | Kragh | ..................... | G06F 21/32 |
| 10,341,304 B1 | 7/2019 | Boutros et al. | | |
| 10,749,875 B2* | 8/2020 | Vincent | ................ | H04L 63/102 |
| 2002/0049749 A1 | 4/2002 | Helgeson et al. | | |
| 2002/0120859 A1 | 8/2002 | Lipkin et al. | | |
| 2003/0229529 A1 | 12/2003 | Mui et al. | | |
| 2008/0027924 A1 | 1/2008 | Hamilton et al. | | |
| 2009/0254572 A1 | 10/2009 | Redlich et al. | | |

(Continued)

*Primary Examiner* — Hanh B Thai
(74) *Attorney, Agent, or Firm* — Knobbe Martens Olson & Bear LLP

(57) ABSTRACT

A system is disclosed that implements features for generating a user-specific content page. In one embodiment, the system includes an identity lifecycle management (ILM) system a platform as a service (PaaS) system, and an application system. The ILM system can store associations of a user with personas, and a list of features of applications, run the application system, associated with each persona. The PaaS system may retrieve data values of the features of the applications associated with the personas of the user from the application system to generate a user-specific content page for the user.

20 Claims, 5 Drawing Sheets

(56) References Cited

U.S. PATENT DOCUMENTS

| | | | |
|---|---|---|---|
| 2010/0180029 A1* | 7/2010 | Fourman | G06F 16/9535 |
| | | | 709/225 |
| 2010/0250497 A1 | 9/2010 | Redlich et al. | |
| 2010/0281427 A1 | 11/2010 | Ghosh et al. | |
| 2012/0159567 A1* | 6/2012 | Toy | G06F 21/6245 |
| | | | 726/1 |
| 2013/0151602 A1 | 6/2013 | McClelland et al. | |
| 2013/0159413 A1 | 6/2013 | Davis et al. | |
| 2013/0304761 A1 | 11/2013 | Redlich | |
| 2014/0075565 A1 | 3/2014 | Srinivasan et al. | |
| 2014/0108457 A1 | 4/2014 | Gala et al. | |
| 2014/0156681 A1* | 6/2014 | Lee | G06F 16/9535 |
| | | | 707/754 |
| 2014/0188585 A1* | 7/2014 | Thompson, Jr. | G06Q 30/0214 |
| | | | 705/14.16 |
| 2016/0105459 A1* | 4/2016 | Esary | H04L 63/10 |
| | | | 709/219 |
| 2016/0321034 A1 | 11/2016 | Yen et al. | |
| 2017/0048319 A1* | 2/2017 | Straub | G06F 16/9574 |
| 2019/0189291 A1* | 6/2019 | Batterton | G16H 80/00 |
| 2020/0007554 A1* | 1/2020 | Vincent | G06F 21/31 |

\* cited by examiner

PERSONA-BASED APPLICATION PLATFORM

CROSS-REFERENCE TO RELATED APPLICATIONS

This application is a continuation of U.S. application Ser. No. 15/436,629, entitled "PERSONA-BASED APPLICATION PLATFORM" and filed on Feb. 17, 2017, which is hereby incorporated by reference herein in its entirety.

TECHNICAL FIELD

The present disclosure relates to computer systems and processes for generating a user-specific content page.

BACKGROUND

An employee may need to access a diverse array of systems and subsystems to fulfill numerous responsibilities. For example, a sales manager needs to access an email system to respond to client inquiries. The manager may access a customer relationship management (CRM) system during various stages in the product cycle, including market research, promotion, and marketing optimization tools. The manager can respond to customer inquiries using a service system, which can be a part of the CRM system. The manager may access a financial system to submit expense reports. The manager may use the financial system to determine compensations, such as overtime and bonuses, for people in the team the manager supervises. The financial system may provide the manager information regarding expenses incurred by or attributable to the team. Needing to access numerous systems and subsystems for an employee to complete tasks and fulfill responsibilities can be time consuming and inefficient.

DETAILED DESCRIPTION OF SPECIFIC EMBODIMENTS

The process by which an employee needs to access a diverse array of systems and subsystems to complete tasks and fulfill job responsibilities is inefficient in a number of respects. For example, an employee typically needs switch between numerous systems and subsystems to fulfill job responsibilities. As another example, the employee has to learn how each system and subsystem works to complete tasks. The training required can be time consuming, for the employee and the information technology (IT) personnel who trains the employee. As another example, setting up user access rights to the systems and subsystems may result in security vulnerabilities. These and other inefficiencies adversely contribute to the average cost and completion time of tasks.

The present disclosure describes a persona-based content generation platform that addresses the above and other inefficiencies. Specific, non-limiting embodiments of the platform will now be described with reference to the drawings. Nothing in this description is intended to imply that any particular feature, component or step is essential.

I. System Overview (FIG. 1)

Figure 1:
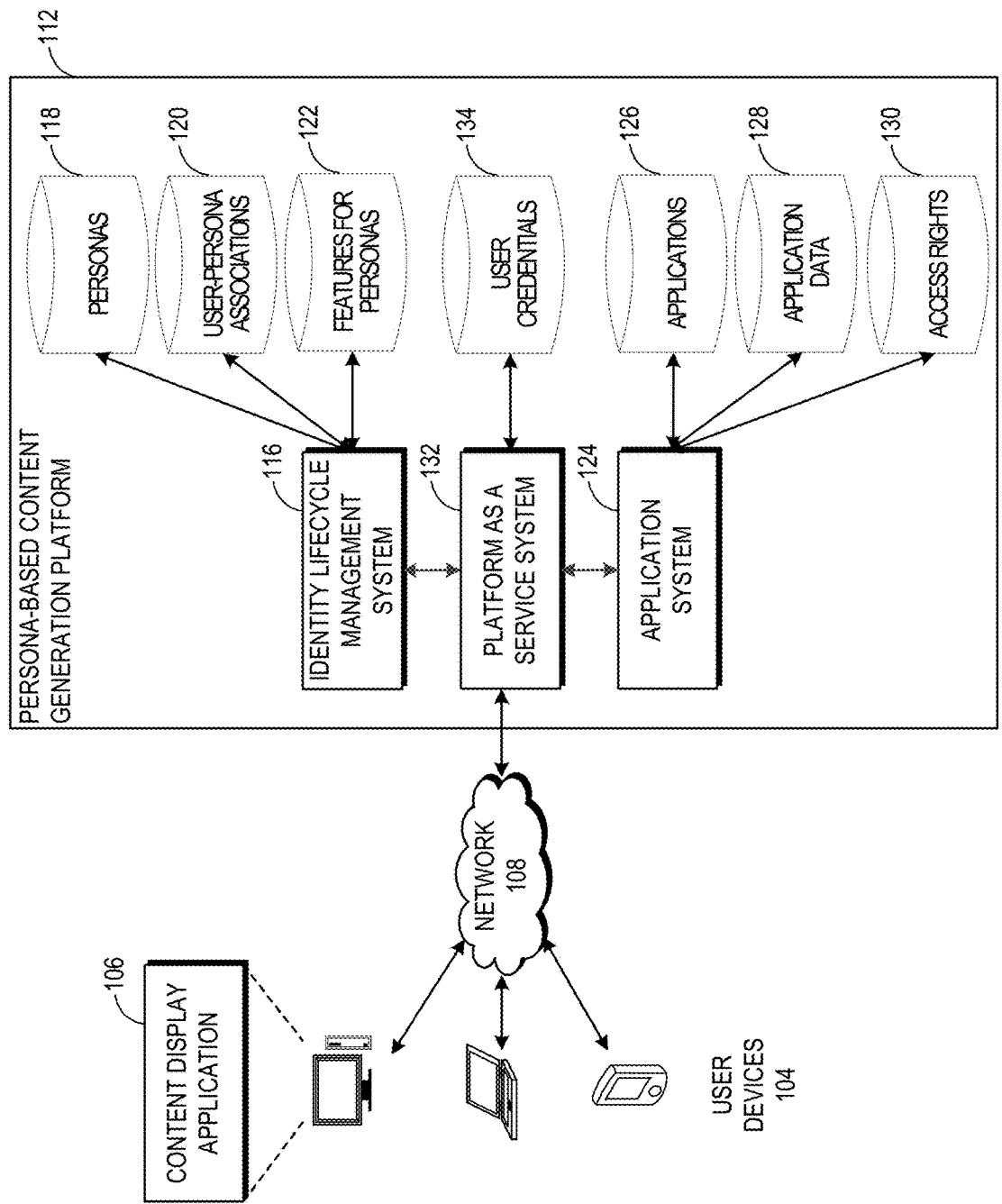
FIG. 1 is a block diagram of a persona-based content generation platform according to one embodiment.

FIG. 1 is a block diagram of a persona-based content generation platform according to one embodiment. The platform includes various systems and components and features for improving the efficiency, and thus reducing the cost and completion time, of user tasks and trainings. As will be apparent, some of these systems and components and features may be used without others. Although the below description focuses primarily on use cases in which the user is a sales manager, the disclosed processes and features are also applicable to users who are not involved with sales. For example, the platform may be used by engineers and scientists to increase the efficiency with which they interact with various design and research tools. As another example, the platform may be used by executives to increase the efficiency with which they interact with various management tools.

As shown in FIG. 1, a user device (e.g., a mobile phone) 104 can include a content display application 106 for accessing, through a network 108, a persona-based content generation platform 112. As will be described, the content display application 106 presents each user (e.g., an employee) with a personalized, user-specific content page, generated by the persona-based content generation platform 112 based on the user's one or more personas. For example, a content display application 106 can be a web browser (e.g., Microsoft® Internet Explorer®, Mozilla® Firefox®, and Google Chrome®). As another example, a content display application 106 can be an App on an Android™ or iOS™ device.

As illustrated in FIG. 1, the persona-based content generation platform 112 includes various executable components, applications, and systems that improve the efficiency of user tasks. The persona-based content generation platform 112 may generate user-specific content pages for a user based on one or more personas associated with the user. An identity lifecycle management (ILM) system 116 of the persona-based content generation platform 112 may store a plurality of personas in a personas repository 118. Non-limiting examples of personas include an employee persona, a sales persona, an expense-incurring persona, a manager persona, a finance persona, a marketing persona, a human resource persona, an information technology persona, an accountant persona, and the like. A persona may be based on one or more roles or responsibilities of an employee or contractor. The ILM system 116 can update the personas repository 118 when new personas have been created or old personas have been removed.

The one or more personas associated with a user may be based on information specifying the user's roles and responsibilities. For example, a sales manager may have one or more of the following personas: an employee persona (e.g., for accessing an email system), a sales persona (e.g., for accessing a customer relationship management (CRM) system or a service system), an expense-incurring persona (e.g., for submitting expense reports), a manager persona (e.g., for reviewing other users' performance), and a finance persona (e.g., for determining compensations or accessing account receivables for customers). A user-persona associations repository 120 may store the associations of a user with one or more personas.

The ILM system 116 can store features of applications (including all features of one or more of the applications) for each persona in a feature-persona associations repository 122. The features of applications each persona needs to access may be related to one or more roles or responsibilities of the persona. For example, the features of applications that a user with the manager persona needs to access may be based on the responsibility of the manager having to monitor the performance of the employees in the team the manager supervises. As another example, the features of applications that a user with the expense-incurring persona needs to access may be based on the responsibility of the user having to submit expense reports. Accordingly, a user with the expense-incurring persona may need to access portions of a finance applicant in order to submit expense reports. However, this user may not need to access the financial analytics features of the finance application. Thus, a user with the expense-incurring persona, and not the accountant persona, may not have access to the financial analytics features of the finance application. As another example, a user with the employee persona may have access to all features of the email application.

As shown in FIG. 1, the persona-based content generation platform 112 may include an application system 124 for running applications stored on an applications repository 126. Non-limiting examples of applications include an email application, a customer relationship management application, a finance application, a telephony application, a human capital management application, a project portfolio management application, a procurement application, and a supply chain management application. An application data repository 128 of the application system 124 may store data values of the features of applications.

As illustrated in FIG. 1, the person-based content generation platform 112 may include a platform as a service (PaaS) system 116 for generating a user-specific content page. When a content display application 106 of a user device 104 attempts to access the persona-based content generation platform 112, the user device 104 can provide the PaaS system 132 with a user's authentication credentials. The PaaS system 132 may compare the user's authentication credentials provided by the user and stored in an authentication repository 134 to authenticate the user. After successful authentication, the PaaS system 132 may access the ILM system 116 to retrieve the user's personas from the personas repository 118 and the features of applications associated with the user's personas from the feature-persona associations repository 122.

The PaaS system 132 may access the application system 124 to request and retrieve data values of the features of applications the user's personas need to access. In one embodiment, the data values of the features of applications retrieved may be based on the user's particular identity. For example, the features of applications that a sales manager and an IT manager need to access may be different. As another example, two sales manager may need to access the same features of applications. However, because the two sales managers may manage different people, they may need to access the performance data of different sales professionals. In one embodiment, the application system 124 can send the PaaS system 132 the data requested based on the access rights of the features of applications associated with each persona and the identity of the user. For example, the application system 124 may retrieve the access rights associated with each persona or user in an access rights repository 130. In another embodiment, the PaaS system 132 can provide the application system 124 with access rights of the features of applications associated with each persona and the user retrieved from ILM system 116. In some implementations, the PaaS system 132 may access applications not run on the application system 124 over the network 108.

With the data retrieved from the application system 124, the PaaS system 132 can generate a user-specific content page for the user. The user-specific content page may comprise the data values of the features of the applications associated with the personas of the user. In one embodiment, the user-specific content page may include links to other features of applications such that the user can easily access more detailed information as necessary. The PaaS system 132 can send the user-specific content page to the user device 104 over the network 108. The content display application 106 may then display the data values of the features of the applications associated with the personas of the user.

The associations of the ILM system 116 with the personas repository 118, the user-persona associations repository 120, and the feature-persona associations repository 122, the PaaS system 132 with the user credentials repository 134, and the application system 124 with the applications repository 126, the application data repository 128, and the access rights repository 130 illustrated in FIG. 1 are for illustrative purposes only and not intended to be limiting. For example, the PaaS 132 may retrieve the access rights associated with each persona from the access rights repository 130 and provide the application system 124 with the access rights retrieved. As another example, after retrieving the features of applications associated with a user's personas from the feature-persona associations repository 122, the PaaS system 132 may retrieve data values of the applications and features of the applications from the application system 124 by providing the application system 124 with the features of applications associated with the user's personas retrieved.

As will be apparent from the foregoing, the disclosed platform is capable of improving the speed and efficiency of user tasks. First, the user is only provided with applications or features of application that the user needs to access to complete job duties and fulfill job responsibilities. Thus, the cost and completion time of user tasks may be reduced and the user's efficiency may be improved. Second, the user requires less training of various complex systems. For example, the user typically does not require any training of any legacy system. Third, the security of the ILM system 116, the applications 126, and application data 128 is improved. For example, during the onboarding process of a new user, a human resource professional may only need to provide the ILM system 116 with the one or more personas associated with the new user. The persona-based content generation platform 112 can then generate a user-specific content page for the user based on the personas associated with the user. Thus, the human resource professional may not need to provide the ILM system 116 with information specifying the detailed roles and responsibilities of the new user, which may lead to errors and unauthorized user access. Additional savings can be achieved in some embodiments where the persona-based content generation platform 112 can be implemented with minimal involvements of IT professionals. For example, the PaaS system 132 may provide a framework for retrieving data values of the features of applications from the application system 124 and generating a user-specific content page automatically with minimal computer coding required.

II. Example Interactions between a Persona-Based Content Generation Platform and a User Device (FIG. 2)

Figure 2:
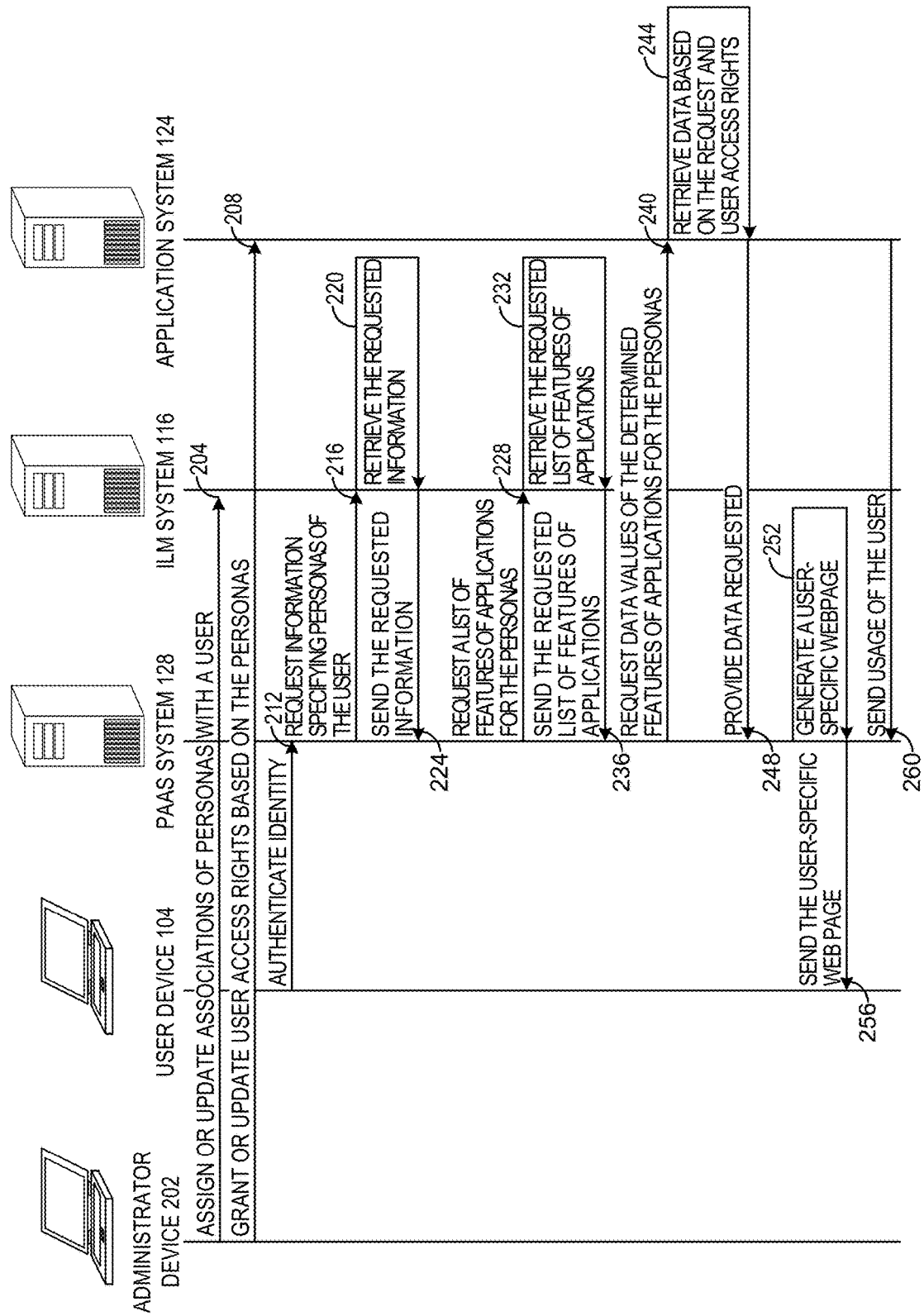
FIG. 2 is an interaction diagram illustrating one embodiment of generating a user-specific content page and transmitting the user-specific content page generated to a user device.

FIG. 2 is an interaction diagram illustrating one embodiment of generating a user-specific content page and transmitting the user-specific content page generated to a user device. An ILM system 116, an application system 124, and a PaaS system 128 of the persona-based content generation platform 112 interact with each other to generate a user-specific content page for improving the efficiency, and thus reducing the cost and completion time, of user tasks and trainings. Although the below description focuses primarily on use cases during the onboarding process of a new user, the disclosed processes and features are also applicable during the offboarding process. The disclosed processes and features are also applicable when a user's roles or responsibilities change such that new user-persona associations may be created and existing user-persona associations may be removed.

During the onboarding process of a new user, a human resource professional, using an administrator device 202, may assign associations of personas with the new user at interaction 204. The ILM system 116 may store the new user-persona associations in a user-persona associations repository 120. During the onboarding process, the human resource professional, using the administrator device 202, can grant user access rights to the user based on the personas associated with the user at interaction 208. The application system 124 may store the user access rights in an access rights repository 130. In one embodiment, after associations of personas with the new user are assigned, the access rights of the user can be determined by the persona-based content generation platform 112 automatically based on the associations and the identity of the user.

As illustrated in FIG. 2, when the user, using a user device 104, attempts to access the persona-based content generation platform 112, the user device 104 may provide the PaaS system 128 with the user's authentication credentials (e.g., a user name and password) at interaction 212. The PaaS system 132 may compare the user's authentication credentials provided by the user and stored in an authentication repository 134 to authenticate the user. After successful authentication, the PaaS system 132 may send the ILM system 116 a request for information specifying the personas associated with the user at interaction 216. After retrieving information specifying the personas associated with the user from the user-persona associations repository 120 at interaction 220, the ILM system 116 may send the retrieved information specifying the personas associated with the user to the PaaS system 128 at interaction 224.

The PaaS system may then send the ILM system 116 a request for a list of features of applications associated with the personas at interaction 236. After retrieving the list of features of applications associated with the personas from the feature-persona associations repository 122 at interaction 232, the ILM system 116 may send the retrieved list of features of applications associated with the personas to the PaaS system 128 at interaction 236. In one embodiment, the ILM system 116 may first retrieve the requested information specifying the personas associated with the user from the user-persona associations repository 120 at interaction 220 and retrieve the list of features of applications associated with the personas from the feature-persona associations repository 122 at interaction 232 without having received a request for a list of features of applications associated with the personas at interaction 236.

As illustrated in FIG. 2, the PaaS system 128 can send a request for data values of the features of applications associated with the personas of the user at interaction 240 to the application system 124. For example, the request can include the personas associated with the user and the identity of the user. The PaaS system 128 may request only the data values of the features of the applications that are required to generate the user-specific content page. In one embodiment, the PaaS system 128 may request additional data values based on predicted user behavior when available. For example, the user may check emails every morning when first accessing the persona-based content generation platform 112. The PaaS system 128 may request the contents of the emails and the metadata of the emails from the application system 124, even if the contents of the emails (or some contents of the emails) may not be required to generate the user-specific content page. After retrieving, at interaction 244, the data values requested, the application system 124 may provide the PaaS system 128 with the data values of the features of the applications associated with the personas of the user at interaction 248.

After receiving the data values of the features of the applications associated with the user's personas, the PaaS system can generate a user-specific content page for the user at interaction 252. In some embodiments, the user-specific content page may be based on the identity of the user and the user's preference. For example, the user may prefer to read unread emails the first thing in the morning. In other embodiments, the user-specific content page may be based on the data values retrieved. For example, if an email is marked as urgent, the email (or a summary of the email) can be prominently displayed in the user-specific content page.

In one embodiment, the user-specific content page may be based on the type of the user device 104. For example, the user-specific content page for a mobile device may include less information than that for a desktop computer. In another embodiment, the user-specific content page may be based on the security levels required for accessing the features of the applications and the security level associated with the user device 104. The security level may be low, medium, or high. Alternatively or in addition, the security level may be numerically based (e.g., 1, 3, 6, 10, or higher). For example, the security level required for accessing the email application may be low, the security level required for accessing current product information may be medium, and the security level required for accessing future product information may be high. If a mobile device has a low security level, the user-specific content page for the mobile device may only include emails. If a laptop computer has a medium security level, the user-specific content page for the mobile device may not include future product information. In some embodiments, the user-specific content page may be based on the security levels required for accessing features of applications associated with personas and the security level of the user device 104. For example, the security level for accessing features of application associated with a senior engineer persona may be low, and a user-specific content page for a mobile device with a low security level may not be based on data values of the features of applications associated with the senior engineer persona. In some embodiments, the user-specific content page may be based on the security levels required for accessing features of applications and the security levels associated with the type of network 108 that the user device 104 is connected to or the location of the user device 104. For example, if the user device 104 is within the same network as the persona-based content generation platform 112, possibly through a virtual private network (VPN) system, the user-specific content page generated may be based on data values of features of applications that require high security level to access. In contrast, the user-specific content page generated for a user device 104 on a public network may be based on only data values of features of applications that require low security level to access. As another example, if the user device 104 is located at an unsafe location or country, the user-specific content page generated for the user device 104 may not be based on features of applications that require medium or high security level to access. The location of the user device 104 can be determined using a global positioning system (GPS) chip on the user device 104. Advantageously, by generating a user-specific content page based on the security level required for accessing features of applications (e.g., associated with personas), the security level of the user device 104, the security level of the network 108, the security level associated with a device location, or other security characteristics (e.g., the recency of user authentication), the persona-based content generation platform 112 can prevent unauthorized access to features of applications.

After generating the user-specific content page, the PaaS system 128 may send the content page generated to the user device 104 at interaction 256. In one embodiment, the application system 124 may monitor the usage of the user of the user-specific content page and send the usage to the PaaS system 128 at interaction 260. The PaaS system can generate subsequent user-specific content pages based on the prior usage of the user. For example, if the application system 124 determines that the user likes to read unread emails the first thing in the morning, the PaaS system 128 may generate user-specific content pages accordingly. In one embodiment, the PaaS system 128 may monitor the usage of the user. In another embodiment, the user can provide the PaaS system 128 with the user's preference for user-specific content pages.

III. Example User-Specific Content Page (FIG. 3)

Figure 3:
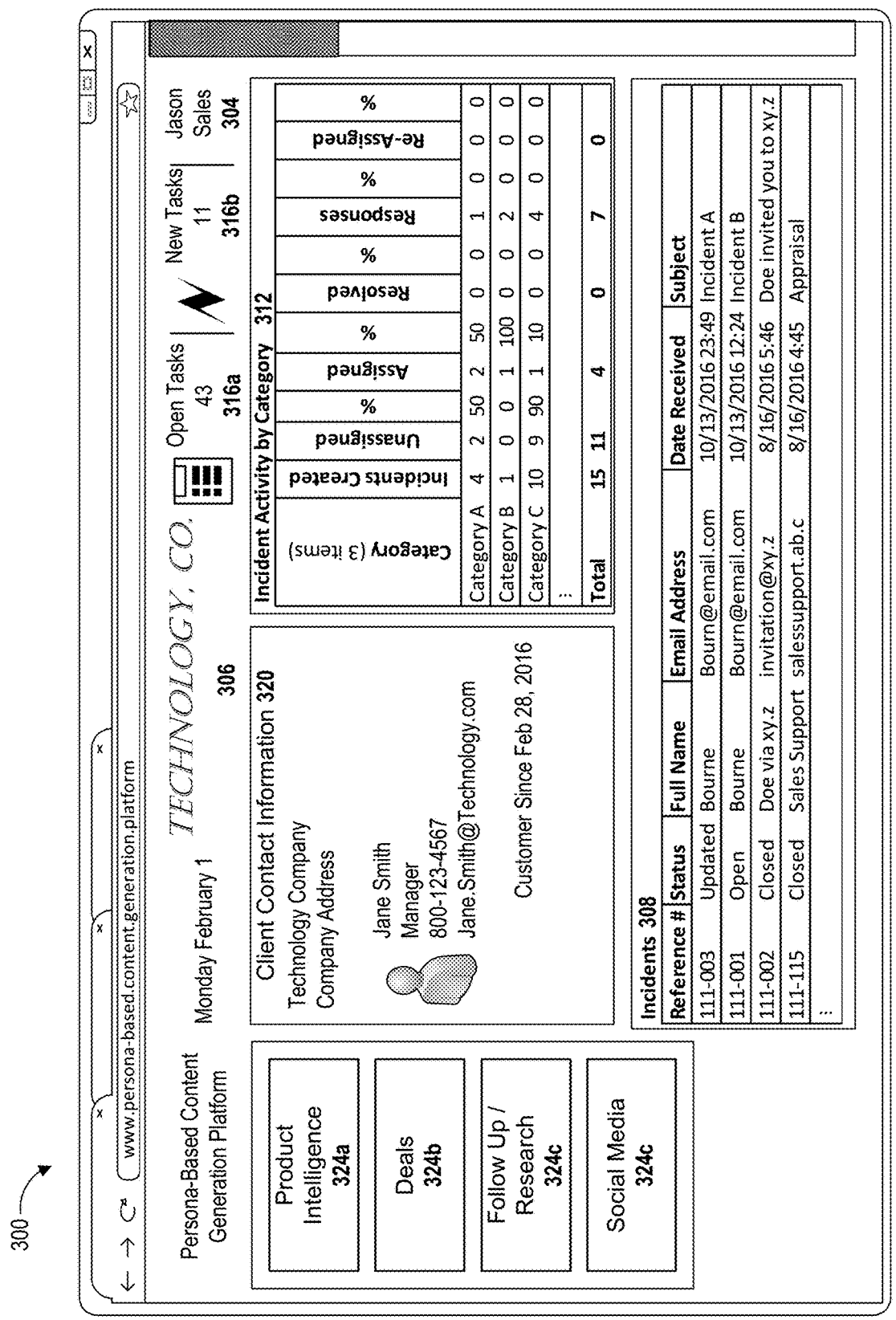
FIG. 3 illustrates an example user-specific content page generated by the persona-based content generation platform in the system of FIG. 1.

FIG. 3 illustrates an example user-specific content page generated by the persona-based content generation platform 112 of FIG. 1. A sales associate 304 of a technology company 306 may be associated with a sales operation persona. A user with the sales operation persona may need to access customer service tickets. The user-specific content page 300 may provide the sales associate with multiple methods of accessing customer service tickets. First, the sales associate may have direct access to a service system (e.g., Oracle® Service Cloud™) for incidents details 308. The service system may be an application implemented by the application system 124. In one embodiment, the service system may not be implemented by the application system 124, and the persona-based content generation platform 112 may access the service system through the network 108. Second, the user-specific content page 300 may provide the sales associate with the ability to pivot incidents between categories 312. For example, the sales associate may pivot incidents by business unit, department, or other related category. The sales associate may monitor the progress of the incidents by categories. Third, the user-specific content page 300 may include links to open tasks 316a and new tasks 316b that require user attention. Accordingly, the user-specific content page 300 may provide the sales associate with visibility into day to day work activities and assignments.

As illustrated in FIG. 3, the user-specific content page 300 may include access to account and sales team details 320 sourced from a customer information system (e.g., Oracle® Customer Hub™). The service system may be an application implemented by the application system 124. In one embodiment, the customer information system may not be implemented by the application system 124, and the persona-based content generation platform 112 may access the customer information system through the network 108. The sales associate may access, via the user-specific content page, product intelligence 324a, such as insight into the performance of products and services offered by a company from a product intelligence system, which may be an application implemented by the application system 124. In one implementation, the sales associate may access deals 324b available to a customer from the product intelligence system. Furthermore, the sales associate may conduct market research and lead generation 324c. In one implementation, the sales associate may leverage social media tools 324d for market research and lead generation, which may be an application implemented by the application system 124.

IV. Process for Generating a User-Specific Content Page (FIG. 4)

Figure 4:
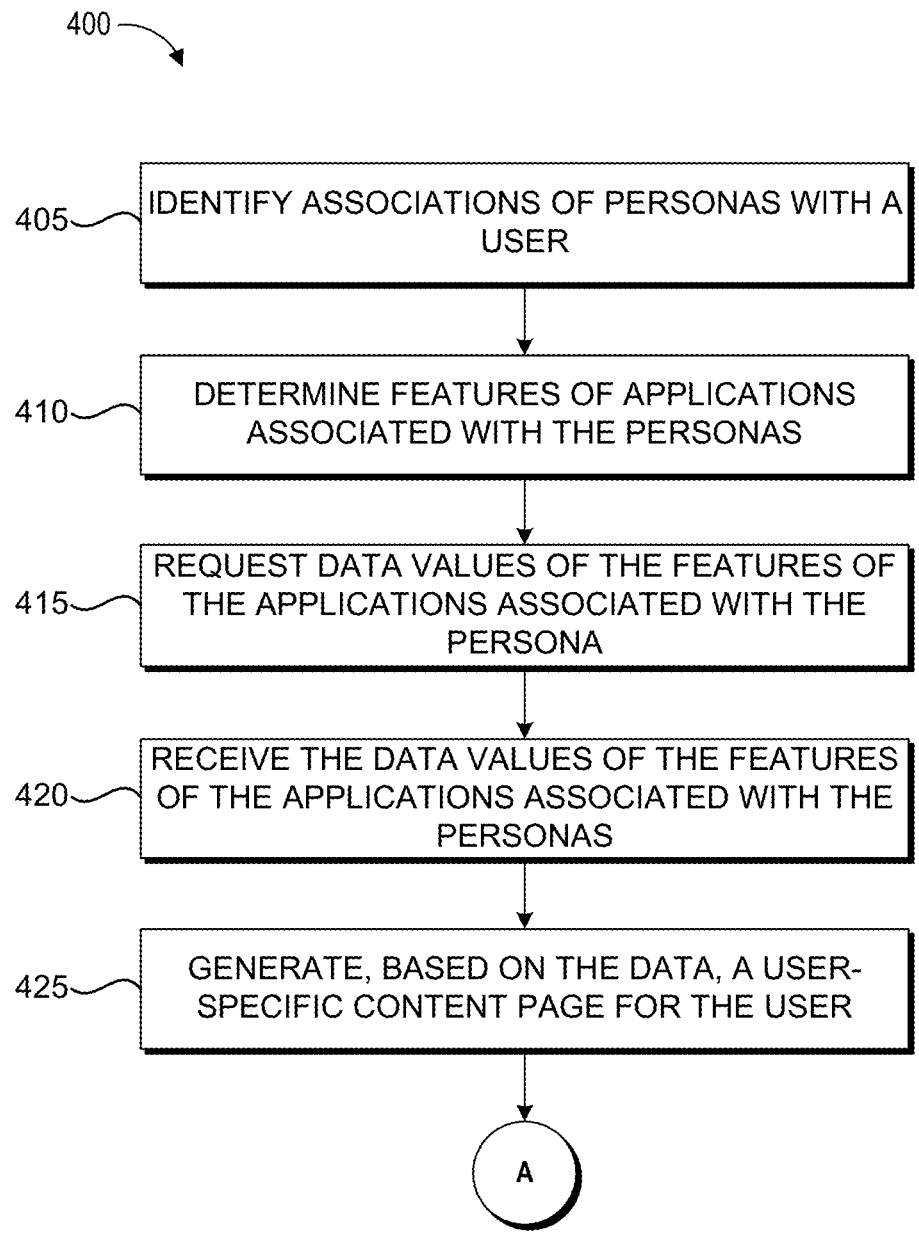
FIG. 4 illustrates a process that may be implemented by the persona-based content generation platform of FIG. 1 to generate a user-specific content page according to one embodiment.

FIG. 4 illustrates a process 400 that may be implemented by the persona-based content generation platform 112 of FIG. 1 to generate a user-specific content page according to one embodiment. This process 400 may be implemented through interaction with a user, or may be partially or fully automated. The persona-based content generation platform 112 may implement the process 400. In block 405, the process 400 may identify associations of personas with a user. For example, the process 400 may receive information specifying the associations of personas with the user. In one embodiment, an association of a persona with the user may be based on a role or a responsibility of the user. The process 400 may receive information specifying the associations of personas with the user from the ILM system 116 or the administrator device 202 in FIG. 2. For example, during the onboarding process 400 of a new user, the process 400 may receive information specifying the personas associated with the new user from the administrator device 202 of a human resource professional. As another example, when a user attempts to access the persona-based content generation platform 112, the platform 112 may receive information specifying the personas associated with the user from the ILM system 116.

In block 410, the process 400 may determine features of applications associated with the personas of the user. For example, the PaaS system 132 may send the ILM system 116 a request for information specifying the personas associated with the user. After retrieving information specifying the personas associated with the user from the user-persona associations repository 120 and the features of applications associated with the personas from the feature-persona associations repository 122, the ILM system 116 may send information specifying the features of the applications with the personas to the PaaS system 128. As another example, the process 400 may determine the features of the applications associated with the personas of the user in a two-step process 400. First, the PaaS system 132 may send the ILM system 116 a request for information specifying the personas associated with the user. Second, after sending the ILM system 116 a request for information specifying the features of applications associated with the user, the PaaS system 132 may receive information specifying the features of the applications requested.

In block 415, the process 400 may request data values of the features of the applications associated with the personas of the user. For example, the PaaS system 132 may send a request for the data values of the features of the applications associated with the personas of the user to the application system 124. As another example, the request may be based on the user's usage or preference. As another example, the request may be based on a specific user input, such as a priority of user tasks. In block 420, the process 400 may receive the data values of the features of the applications associated with the personas of the user. For example, after retrieving the data values requested, the application system 124 may provide the PaaS system 128 with the data values of the features of the applications associated with the personas of the user.

In block 425, the process 400 may generate a user-specific content page for the user. For example, the process 400 may generate the user-specific content page based on the data values of the features of the applications associated with the personas of the user. In one embodiment, the process 400 may generate the user-specific content page based on the identity of the user and the roles or responsibilities of the user. The process 400 may generate the user-specific content page to facilitate the roles or the responsibilities of the user. For example, the PaaS system 132 may generate the user-specific content page. In another embodiment, the process 400 may generate the user-specific content page based on the user usage or preference.

V. Monitoring a User-Specific Content Page (FIG. 5)

Figure 5:
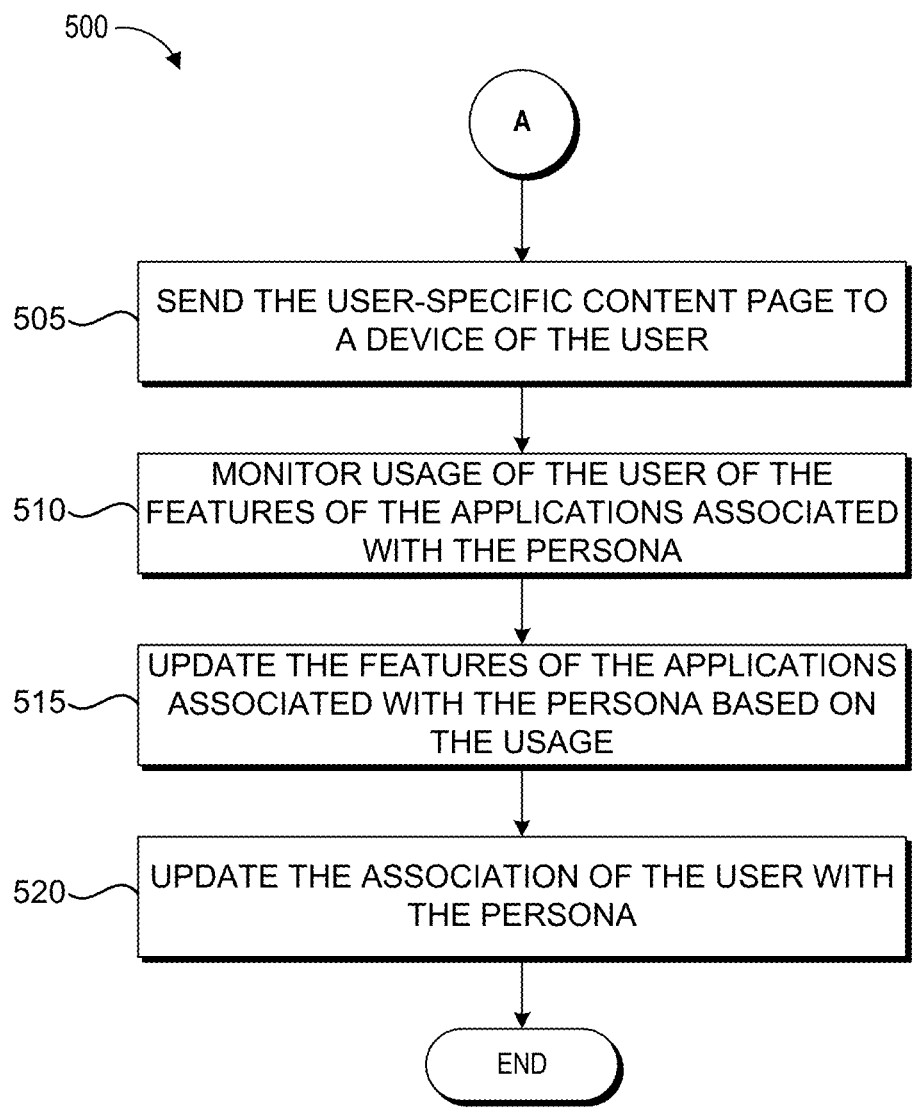
FIG. 5 illustrates a process that may be implemented by the persona-based content generation platform of FIG. 1 to monitor a user's usage of a user-specific content page accordingly to one embodiment.

FIG. 5 illustrates a process 500 that may be implemented by the persona-based content generation platform of FIG. 1 to monitor a user's usage of a user-specific content page accordingly to one embodiment. The process 500 may be implemented following implementation of the process 400, discussed above, such that block 505 occurs subsequent to block 425 described above. In block 505, the process 500 may send the user-specific content page to a device 104 of the user (e.g., the user device 104). In one embodiment, the user-specific content page generated in block 425 may be based on the type of the user device. For example, the user-specific content page for a mobile device may include less information to reduce cluttering of the page. In another embodiment, the user-specific content page generated in block 425 may be based on the security level required for accessing features of applications (e.g., associated with personas), the security level of the user device 104, the security level of the network 108, the security level associated with a device location, or other security characteristics (e.g., the recency of user authentication).

In block 510, the process 500 may monitor usage of the user of the features of the applications associated with the personas of the user. The user-specific content page generated at block 425 may be based on prior user usage of the features of the application associated with the personas of the user. For example, the application system 124 may monitor the usage of the user send the usage to the PaaS system 128. As another example, the PaaS system 128 may monitor the usage of the user. Accordingly, the user-specific content page generated may be specifically tailored for the user based on the user's usage and personas associated with the user's personas.

In block 515, the process 500 may update the features of the applications associated with the personas of the user based on the usage of the user. For example, the PaaS system 128 may store the usage of the user in a user usage and preference repository of the persona-based content generation platform 112. Additionally or alternatively, the user usage and preference repository may store user preferences. As another example, the application system 124 may store the usage of the user in a user usage and preference repository. As yet another example, the person-based content generation platform 112 may monitor user usage for accounting purposes (e.g., costs attributable to a persona or the user) or auditing purposes (e.g., to determine authorized access or intrusion to the platform or a system of the platform).

Referring again to FIG. 1, the persona-based content generation platform 112, including its illustrated ILM system 116, application system 124, and PaaS system 132, may be implemented by a computer system programmed with executable program modules stored on one or more computer-readable media (hard disk drives, solid state memory devices, etc.). The persona-based content generation platform 112 may be distributed or replicated across multiple physical servers or other computing devices of the computer system, which may or may not be co-located. Each such server typically includes one or more hardware processors that execute program instructions, a solid state memory, a network interface, and various other hardware components. The computer system may, in some embodiments, be a cloud computing system. The functionality of the components of the persona-based content generation platform 112 may be distributed among systems and software components differently than shown in FIG. 1, and some systems, components and functions may be omitted in some embodiments.

The various data repositories 118, 120, 122, 126, 128, 130, 134 shown in FIG. 1 may include databases, flat file systems, and/or other types of data storage systems, and may use hard disk drives, solid state memories, and/or other types of non-transitory computer storage devices. Although shown as separate data repositories, two or more of the illustrated data repositories 118, 120, 122, 126, 128, 130, 134 can be combined.

The user device 104 may be any of a number of computing devices that are capable of communicating over a network including, but not limited to, a laptop, personal computer, personal digital assistant (PDA), hybrid PDA/mobile phone, mobile phone, smartphone, a smart watch, electronic book reader, digital media player, tablet computer, gaming console or controller, kiosk, augmented reality device, other wireless device, set-top or other television box, and the like. The content display application 106 may be implemented in executable program code that is stored in the non-transitory computer storage (e.g., solid state memories) of the user devices 104. All of the processes and process steps described above be embodied in, and fully automated via, the program components described above. Some or all of the functions may instead be performed by specialized computer hardware, such as ASICs or FPGA devices.

The network 108 may be any wired network, wireless network or combination thereof. In addition, the network 108 may be a personal area network, local area network, wide area network, cable network, satellite network, cellular telephone network, etc. or combination thereof. For example, the network 108 may be a publicly accessible network of linked networks, possibly operated by various distinct parties, such as the Internet. In some embodiments, the network 108 may be a private or semi-private network, such as a corporate or university intranet. The network 108 may include one or more wireless networks, such as a Global System for Mobile Communications (GSM) network, a Code Division Multiple Access (CDMA) network, a Long Term Evolution (LTE) network, or some other type of wireless network. The network 108 may use protocols and components for communicating via the Internet or any of the other aforementioned types of networks.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
a first database that stores role data that indicates a role of a user and one or more features of an application associated with the role;
a second database that stores a first data value and a second data value of the one or more features of the application associated with the role; and
a computer system comprising instructions that, when executed, direct the computer system to:
retrieve from the second database the first data value and the second data value in response to a determination that the user is associated with the role, wherein the first data value can be accessed with at least a first security level, wherein the second data value can be accessed with at least a second security level, and wherein access with the second security level is more limited than access with the first security level;
determine that a user device operated by the user is associated with the first security level; and
generate a user-specific content page for the user that comprises the first data value in response to the determination that the user device operated by the user is associated with the first security level.

2. The system of claim 1, wherein the instructions, when executed, further direct the computer system to determine that the user is associated with the role based on a request sent to the first database.

3. The system of claim 1, wherein the instructions, when executed, further direct the computer system to obtain information specifying access rights of the one or more features of the application associated with the role.

4. The system of claim 3, wherein the instructions, when executed, further direct the computer system to obtain the information specifying the access rights of the one or more features of the application associated with the role from the first database.

5. The system of claim 1, wherein the instructions, when executed, further direct the computer system to send the user-specific content page to a device of the user over a network, and wherein the device is programmed to display the first data value to the user.

6. The system of claim 1, wherein the second data value is based on a predicted behavior of the user in association with the application.

7. The system of claim 6, wherein the second data value comprises content of one or more emails.

8. A computer-implemented method comprising:
determining that a user is associated with a role;
transmitting an indication of the role of the user and an identity of the user;
receiving a first data value and a second data value of one or more features of an application associated with the role received in response to transmission of the indication of the role of the user and the identity of the user, wherein the first data value can be accessed with at least a first security level, wherein the second data value can be accessed with at least a second security level, and wherein access with the second security level is more limited than access with the first security level;
determining that a user device operated by the user is associated with the first security level; and
generating a user-specific content page for the user that comprises the first data value in response to the determination that the user device operated by the user is associated with the first security level.

9. The computer-implemented method of claim 8, wherein the role of the user is based at least in part on a responsibility of the user.

10. The computer-implemented method of claim 9, wherein the user-specific content page is generated based at least in part on the responsibility of the user.

11. The computer-implemented method of claim 9, wherein the user-specific content page is generated to facilitate the responsibility of the user.

12. The computer-implemented method of claim 8, further comprising sending the user-specific content page to a device of the user.

13. The computer-implemented method of claim 8, further comprising monitoring usage of the user of the one or more features of the application associated with the role.

14. The computer-implemented method of claim 13, wherein generating a user-specific content page further comprises generating the user-specific content page based at least in part on the usage, of the user, of the one or more features of the application associated with the role.

15. The computer-implemented method of claim 8, wherein the second data value is based on a predicted behavior of the user in association with the application.

16. A non-transitory computer readable medium having stored thereon executable instructions that direct a computer system to at least:
determine that a user is associated with a role;
transmit an indication of the role of the user and an identity of the user;
process a first data value and a second data value of features of an application associated with the role received in response to transmission of the indication of the role of the user and the identity of the user, wherein the first data value can be accessed with at least a first security level, wherein the second data value can be accessed with at least a second security level, and wherein access with the second security level is more limited than access with the first security level; and generate, using the identity of the user in combination with the first data value, a user-specific content page for the user.

17. The non-transitory computer-readable medium of claim 16, wherein the executable instructions further direct the computer system to cause display of the user-specific content page on a device of the user.

18. The non-transitory computer-readable medium of claim 16, wherein the executable instructions further direct the computer system to authenticate the identity of the user prior to the executable instructions that direct the computer system to generate the user-specific content page of the user.

19. The non-transitory computer-readable medium of claim 17, wherein the second data value is based on a predicted behavior of the user in association with the application.

20. The non-transitory computer-readable medium of claim 19, wherein the second data value comprises content of one or more emails.

* * * * *